UNITED STATES PATENT OFFICE.

SVEN EDMUND BOIVIE, OF RAGNHILDSBORG, SWEDEN.

PROCESS OF MANUFACTURING ARTIFICIAL STONE.

SPECIFICATION forming part of Letters Patent No. 685,094, dated October 22, 1901.

Application filed June 7, 1901. Serial No. 63,616. (No specimens.)

*To all whom it may concern:*

Be it known that I, SVEN EDMUND BOIVIE, a subject of the King of Sweden and Norway, residing at Ragnhildsborg, Sweden, have invented certain new and useful Improvements in Processes for the Manufacture of Artificial Stone; and I do hereby declare the following to be a full, clear, and exact description of the invention, such as will enable others skilled in the art to which it appertains to make and use the same.

This invention relates to an improved process for the manufacture of artificial stone, and has for its object to produce an artificial stone which shall be fireproof to a very high degree.

The materials utilized according to this invention are slaked lime and quartz or slate, and when pure quartz sand can be obtained it may be used in lieu of the two last-named substances. After having mixed suitable proportions of slaked lime and quartz or slate or sand nitric acid is poured over the mixture, which latter is then pressed into slabs or blocks of any desired form.

The following proportions I have found to give satisfactory results, the parts being by weight: three to five per cent. of lime and ninety-seven to ninety-five per cent. of quartz.

The mixture of lime and quartz, or in lieu thereof slate or sand, is mixed with from three to four parts, by weight, of a ten-per-cent. solution of nitric acid. For instance, three thousand eight hundred kilograms of the mixture are mixed with one hundred and fifty liters of a ten-per-cent. solution of nitric acid.

The nitric acid has the quality of rendering the stones fireproof to a very high degree, and this quality is still further enhanced by the treatment with steam of about eight atmospheric pressure, to which the stone is subjected after pressing.

Though slaked lime is to be preferred, one can naturally instead thereof use unslaked lime.

The previously-described process, in which the addition of nitric acid is of the greatest importance, has the advantage, as compared with the known methods, of enabling directly-slaked lime to be used instead of unslaked lime. Thus the troublesome and slow operation of heaping up lime and sand for slaking is entirely unnecessary, and the final pressing of the stones can be effected directly after the mixing operation.

Having now particularly described and ascertained the nature of my said invention and in what manner the same is to be performed, I declare that what I claim is—

1. The herein-described process, which consists in mixing lime, and a silicious material with nitric acid, and molding the mixture under pressure, for the purpose set forth.

2. The herein-described process, which consists in mixing lime and a silicious material with nitric acid, molding the mixture under pressure and subjecting the molded articles to the action of steam under pressure, for the purposes set forth.

3. An artificial-stone compound, consisting of lime, a silicious material and nitric acid, substantially as set forth.

In testimony that I claim the foregoing as my invention I have signed my name in presence of two subscribing witnesses.

SVEN EDMUND BOIVIE.

Witnesses:
   K. KALLENBERG,
   KONR. DAHLQVIST.